United States Patent [19]
Dolby

[11] 3,854,590
[45] Dec. 17, 1974

[54] WINE RACK
[75] Inventor: John Topping Dolby, Winnetka, Ill.
[73] Assignees: John T. Dolby; David M. Bender, both of Chicago, Ill.
[22] Filed: Nov. 20, 1972
[21] Appl. No.: 307,938

[52] U.S. Cl. .................. 211/74, 248/105, 248/146, 248/315
[51] Int. Cl. .. A47b 73/00, A47b 69/00, A47g 23/02
[58] Field of Search ............ D7/71; D9/176; 211/74, 211/77, 78, 70, 129, 164, 95; 217/19; 222/173; 248/105, 315, 311, 146; 312/97.1

[56] References Cited
UNITED STATES PATENTS

| | | | |
|---|---|---|---|
| 353,554 | 11/1886 | Godfrey | 211/77 |
| 380,473 | 4/1888 | Austin | 211/74 |
| 872,274 | 11/1907 | Brooks | 211/74 |
| 2,489,773 | 11/1949 | Hall | 248/105 |
| 2,883,063 | 4/1959 | Baren | 211/74 |
| 3,261,380 | 7/1966 | Holleman | 211/74 UX |
| 3,295,671 | 1/1967 | Wuensch | 211/74 X |

*Primary Examiner*—Marion Parsons, Jr.
*Assistant Examiner*—Abraham Frankel
*Attorney, Agent, or Firm*—Merriam, Marshall, Shapiro & Klose

[57] ABSTRACT

In a wine rack, the wine bottles are supported by disk-like units or plates each having two bottle-sized apertures therein. These plates are disposed in a fixed, spaced relation along a rod which is perpendicularly disposed through an opening in each plate near its periphery. The plates are fanned out in the form of a helix whose axis is the aforementioned rod, such that common bottle apertures are created by the concentric alignment of alternating bottle apertures of the plates.

9 Claims, 4 Drawing Figures

PATENTED DEC 17 1974

3,854,590

WINE RACK

BACKGROUND OF THE INVENTION

The present invention relates generally to racks for storing bottles and more specifically to inexpensive, decorative wine racks.

The wine racks of the prior art often were unattractive in appearance, making them unsuitable for display in living areas. Frequently, those wine racks of the prior art which were sufficiently attractive in design were not sufficiently functional.

Two common shortcomings of those prior art wine racks which were somewhat attractive in appearance were that often they could not store a sufficient number of wine bottles or the bottles which were stored were not adequately supported. In addition, many such wine racks had a multiplicity of different parts necessitating greater time, expense and labor in their manufacture.

SUMMARY OF THE INVENTION

A wine rack in accordance with the present invention greatly reduces the problems associated with prior art wine racks, in that it is attractive in appearance, yet stable in design, and relatively few different types of parts are needed to manufacture it.

The present invention has a multiplicity of identical disk-like elements or plates, disposed in a parallel relation, each having two bottle-sized apertures therein. These plates are held in a fixed, spaced relation, described in greater detail, infra, by a single hexagonal rod perpendicularly disposed through corresponding hexagonal rod openings located near the periphery of each plate. The use of a hexagonal rod and corresponding hexagonal rod openings, rather than a cylindrical rod and round openings, prevents rotation of the plates. Round openings and rods may be used, but the pressure required to hold the parts together would have to be much greater to avoid slipping and turning.

A plate is separated from adjacent plates by cylindrical spacers. The plates are fanned out along the hexagonal rod which forms the axis of a helix which repeats every six plates. The use of a hexagonal rod and corresponding hexagonal openings gives the result that after a first plate is positioned on the rod, a second plate may be disposed in a fixed, spaced relation at an angle of 60° thereto and the third plate may be disposed in a fixed, spaced relation at an angle of 120° thereto. This pattern continues for six plates, which completes a full 360°. The same helical pattern continues for plates 7–12, with plate 7 being positioned directly in line with plate 1, plate 8 in line with plate 2, etc.

The wine bottles are supported by common bottle apertures formed by concentric alignment of bottle apertures, each plate having two such apertures therein. Viewing the present invention axially, since a second plate is disposed in a fixed, spaced relationship at an angle of 60° to a first plate, a first bottle aperture of the second plate is in concentric alignment with a second bottle aperture of the first plate. Correspondingly, the second bottle aperture of the second plate is in concentric alignment with the first bottle aperture of a third plate. Since plate 7 in its entirety is aligned with plate 1, both bottle apertures of plate 7 are concentrically aligned with those of plate 1. Since the periodicity of the helix of plates is six, i.e., the helix repeats every six plates, and a total of 12 plates are used, each bottle passes through and is supported by the bottle apertures of two plates in each revolution of the helix, or by a total of four plates, the neck portion of the bottle being supported by two plates and the base portion of the bottle being supported by two plates. This arrangement proves to be more than adequate support for each bottle.

Stability is provided to the horizontally resting helix, the plates of which rest on their round edges, by attaching to the resting surface of one or more of the plates small stabilizing feet, which are best made of the same material as the plate so as to be relatively unnoticeable.

Other features and advantages inherent in the structure claimed and disclosed will become apparent to those skilled in the art from the following detailed description in conjunction with the accompanying diagrammatic drawing.

DETAILED DESCRIPTION

Figure 1:
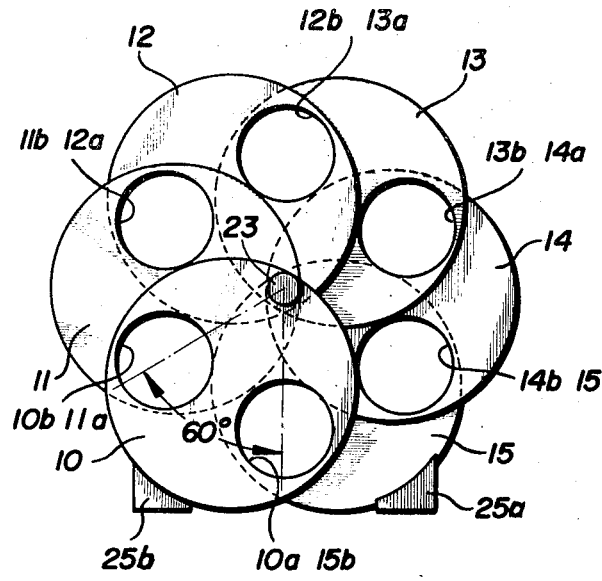
FIG. 1 is an axial view showing plates in fixed, spaced relation and also showing the stabilizing feet.

Referring to FIG. 1, the present invention comprises twelve spaced disks or plates in a fixed, spaced relation fanned out in the form of a helix whose axis is a rod disposed through an opening in each plate near its periphery. FIG. 1 is an axial view showing six plates, plates 10, 11, 12, 13, 14 and 15, which are disposed in helical configuration with six plates to one revolution of the helix. The helix forming the present invention comprises two revolutions.

Each plate is disk-like in appearance, i.e., round and relatively thin. Near the periphery of each disk is a hexagonal opening of a size corresponding to that of the cross section of the hexagonal rod holding the plates together. As shown by FIG. 1, each disk also has two bottle-sized apertures therein, the centers of which are equidistant from the hexagonal rod opening and separated from each other by an angle of 60°, the vertex of which is the center of the hexagonal rod opening. This location of the bottle apertures assures the concentric alignment of apertures of the plates when they are fanned out along the hexagonal rod in the form of a helix.

The plates of the present invention are fanned out along the axis of rod 24 such that a second bottle aperture of a first plate will be concentric with a first bottle aperture of the next plate in the helix. Plate 10 has first and second bottle apertures, 10a and 10b. Positioned in fixed spaced relation along the axis of the helix behind plate 10 at an angle of 60° therefrom is plate 11, having first and second bottle apertures 11a and 11b. First bottle aperture 11a is concentrically aligned with second aperture 10b forming thereby a concentric common aperture 10b–11a, into which a bottle to be supported may be inserted. Positioned at an angle of 60° from plate 11 is plate 12 having bottle apertures 12a and 12b. Aperture 12a is concentrically axially aligned with aperture 11b forming thereby common aperture 11b–12a, into which a second bottle may be inserted.

Plate 13 having first and second bottle apertures 13a and 13b, whose aperture 13a is concentrically axially aligned with aperture 12b forms a common aperture 12b–13a, into which a third bottle base portion may be inserted.

Plate 14 having bottle apertures 14a and 14b is positioned at an angle of 60° from plate 13. Aperture 14a is concentrically axially aligned with aperture 13b forming thereby common aperture 13b–14a, into which a fourth bottle may be inserted.

Plate 15 having bottle apertures 15a and 15b is positioned at an angle of 60° from plate 14. Aperture 15a is concentrically axially aligned with aperture 14b forming thereby common aperture 14b–15a, into which a fifth bottle may be inserted.

Aperture 15b is concentrically axially aligned with aperture 10a, but is spaced not directly behind it. Instead, it is separated from plate 10 by a distance amounting to the thickness of four plates and five spacers. Apertures 15b and 10a form common aperture 15b–10a into which a sixth bottle may be inserted.

The spaced alignment of plates 10, 11, 12, 13, 14, and 15 is repeated with plates 16, 17, 18, 19, 20 and 21 respectively along hexagonal rod 24. FIG. 1 does not show plates 16, 17, 18, 19, 20 and 21 since in their entireties they are concentrically aligned with plates 10, 11, 12, 13, 14 and 15, respectively. Just as with plates 10–15, common apertures 16b–17a, 17b–18a, 18b–19a, 19b–20a, 20b–21a, and 21b–16a (not shown in FIG. 1) are formed by the concentric alignment of the apertures of adjacent plates 16–21 in the helical configuration of the present invention.

Figure 2:
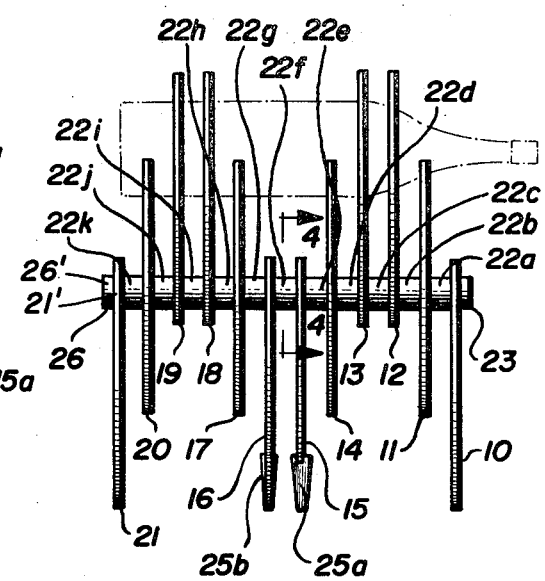
FIG. 2 is a side elevation showing the present invention positioned with its axis parallel to the surface upon which it rests, as in actual use, with its plates being separated by spacers.

Supporting feet 25a and 25b, preferably made of the same material as are the plates, the hexagonal rod and the cylindrical spacers, are positioned at the bottom of plates 15 and 16, as shown in FIGS. 1 and 2, to prevent the rack from rolling when it is placed on its resting surface parallel to the axis of the rod, as it would be placed in actual use to hold wine bottles in the horizontal position.

Referring to FIG. 2, which is a side elevation of the present invention, plates 10 through 21 are fanned out along the axis of rod 24 in the form of a helix and are separated from each other by cylindrical spacers 22a through 22k. A wine bottle to be supported has been placed in common apertures 12b–13a, 18b–19a with the base portion being supported by plates 18 and 19 and the neck portion being supported by plates 12 and 13.

Figure 3:
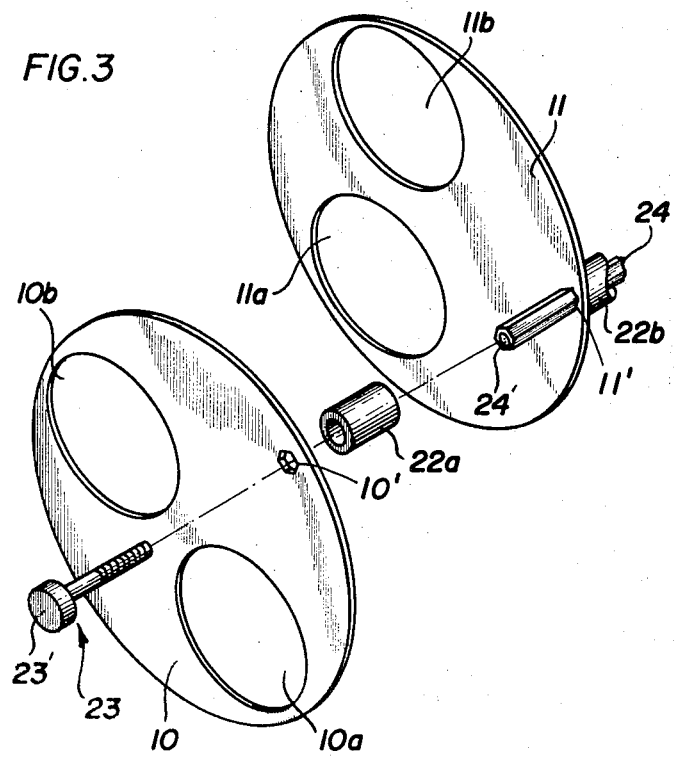
FIG. 3 is a partial exploded perspective view showing the hexagonal rod, corresponding hexagonal rod openings in the various plates, spacers, and the end bolt assembly.

Referring to FIGS. 2 and 3, rod bolt 23, having head portion 23' sufficiently larger than hexagonal rod opening 10' to prevent plate 10 from becoming loose or falling off, is screwed into bolt aperture 24' to hold the plates and spacers firmly. Rod bolt 26, having a head portion 26' similar in size and shape to head portion 23' of bolt 23 to give symmetry of design to the structure, is likewise larger than hexagonal rod hole 21' in plate 21 to thereby hold the plates and spacers of the present invention firmly.

Referring to FIGS. 1 and 2, the helical disposition of plates 10 through 21 is shown. Since the helical disposition of the plates of the present invention has a periodicity of six and is repeated twice, a second bottle aperture of a first plate is concentric with a first bottle aperture of, an adjacent second plate, and there are two convolutions of the helix, one bottle is supported by the bottle apertures of four plates.

Referring to FIG. 3, which shows a fragmentary exploded perspective of the present invention, hexagonal rod 24 is shown inserted into hexagonal opening 11' of plate 11 having first and second bottle apertures 11a and 11b therein. Rod bolt 23, shown in exploded perspective therefrom, is to be screwed into threaded bolt aperture 24' in the end of the terminal portion of hexagonal rod 24 in order to hold plate 10 firmly in position. Since rod 24 and corresponding rod openings 10' and 11' are hexagonal in shape, plate 11 may be slid onto rod 24 at an angle of 60° from plate 10. Since both rod 24 and the various corresponding rod openings are hexagonal in shape, inadvertent rotation of the plates which would cause misalignment of the bottle apertures is prevented. Also seen in FIG. 3 is cylindrical spacer 22a, as well as a fragmentary view of cylindrical spacer 22b.

Figure 4:
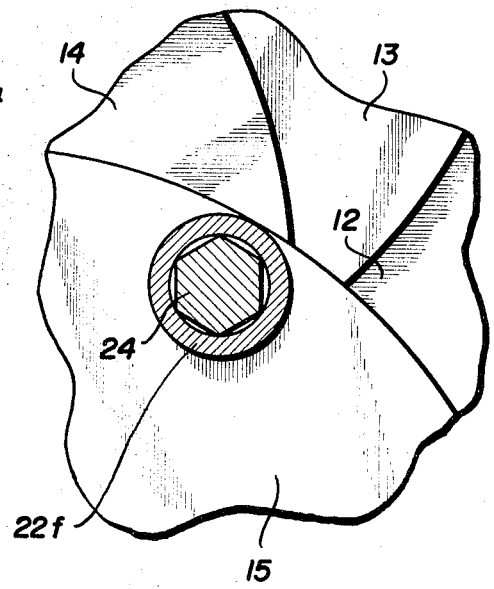
FIG. 4, taken along the indicated lines in FIG. 2, is a detailed cross-sectional view of the rod and rod holding mechanism.

Referring to FIG. 4, taken along the indicated sectional line of FIG. 2, the peripheral portion of plate 15 is seen. A cross section of hexagonal rod 24 surrounded by cylindrical spacer 22f is shown. Plate 15 is disposed in fixed, spaced relation along the axis of hexagonal rod 24 at angles of 60° to plate 14, 120° to plate 13, and 180° to plate 12.

The preferred embodiment of the present invention has all parts made of clear plexiglass, although other colors of plexiglass and other materials may be suitable. In the embodiment shown, the hexagonal rod is 8 inches long and nine-sixteenths inch in diameter, the plates are 0.165 thousands thick and 12 inches in diameter, and the bottle apertures therein are 3¼ inches in diameter.

The forms of the invention herein shown and described are to be considered only as illustrative. It will be apparent to those skilled in the art that numerous modifications may be made therein without departure from the spirit of the invention or the scope of the appended claims.

What is claimed is:

1. A wine bottle rack comprising:
   a rod;
   a plurality of circular, disk-like plates disposed in a fixed, spaced relation along said rod, each of said plates having a first and second bottle aperture therein of sufficient size to accommodate a bottle to be stored therein;
   said plates being disposed in helical relation on said rod; and,
   means for aligning said plates in said fixed, spaced relation whereby a second bottle aperture of a first plate is aligned concentrically with a first bottle aperture of a second plate, to bound and form thereby a common aperture suitable for use as a bottle storing space.

2. An apparatus for supporting axially elongated objects, said apparatus comprising:
   a rod having first and second opposed end portions;

a plurality of plate members each eccentrically disposed along the length of said rod in rigid offset relation to an adjacent plate member;

means on said rod and in each of said plate members for mounting each plate member on said rod in said offset relation and for preventing the rotational movement of each plate member about said rod;

means, including apertured support means in each plate member, whereby support means in one plate member is aligned with support means in at least one other plate member, for supporting at least one of said objects with the axis of said object extending transversely to each plate member; and, means for maintaining adjacent plate members axially spaced along said rod.

3. An apparatus as set forth in claim 2 wherein said plate members are helically disposed in a parallel ralation along the length of said rod.

4. An apparatus as set forth in claim 2 wherein said plurality of plate members define a double helix.

5. An apparatus as set forth in claim 2 wherein said means for supporting said object further comprises means for permitting said object to pass freely through each plate member in both axial directions.

6. An apparatus as set forth in claim 2 and further comprising means on at least two of said plate members for supporting said apparatus with said plate members disposed in a vertical position.

7. An apparatus as set forth in claim 2 and further comprising means on said first and second opposed end portions of said rod for releasably securing said plate members to said rod.

8. An apparatus as set forth in claim 2 wherein said means for mounting each plate member on said rod comprises:

a noncircular cross section on said rod; and, a rod aperture in each of said plate members for receiving said rod.

9. A rod as set forth in claim 8 wherein said cross section is a polygon.

* * * * *